United States Patent

Eidler et al.

[11] Patent Number: 5,308,718
[45] Date of Patent: May 3, 1994

[54] END BLOCK CONSTRUCTIONS FOR BATTERIES

[75] Inventors: Phillip A. Eidler, Muskego; Wayne W. Blazek, Milwaukee; John V. Berndt, Shorewood, all of Wis.

[73] Assignee: Globe-Union Inc., Milwaukee, Wis.

[21] Appl. No.: 5,484

[22] Filed: Jan. 15, 1993

[51] Int. Cl.$^5$ .................................. H01M 2/00
[52] U.S. Cl. ........................... 429/152; 429/70
[58] Field of Search ............ 429/210, 152, 149, 153, 429/27, 34, 38, 39, 72, 163

[56] References Cited

U.S. PATENT DOCUMENTS

| | | | |
|---|---|---|---|
| 4,911,993 | 3/1990 | Turley et al. | 429/27 |
| 4,929,325 | 5/1990 | Bowen et al. | 429/18 X |
| 4,945,019 | 7/1990 | Bowen et al. | 429/72 |
| 4,948,681 | 8/1990 | Zagrodnik et al. | 429/34 |
| 5,002,841 | 3/1991 | Belongia et al. | 429/70 |

Primary Examiner—Anthony Skapars
Attorney, Agent, or Firm—Foley & Lardner

[57] ABSTRACT

Improvements in the end block design for zinc/bromine batteries include modification of the end block configuration which previously has included rigid resin covers and end block plates with a honeycomb structure sandwiched therebetween. Such prior structures were used adjacent to terminal electrode frames. In the present invention, the terminal electrodes are preferably contained within the end plate, thereby eliminating two components used in prior zinc/bromine battery design and the end block itself is formed from two components by building a rib structure into the plate and cover and welding the two components together to join the ribs and form an integral and structurally sound unit. The end block configuration could be used for bipolar lead-acid batteries or other types of flowing or non-flowing batteries or capacitors.

18 Claims, 4 Drawing Sheets

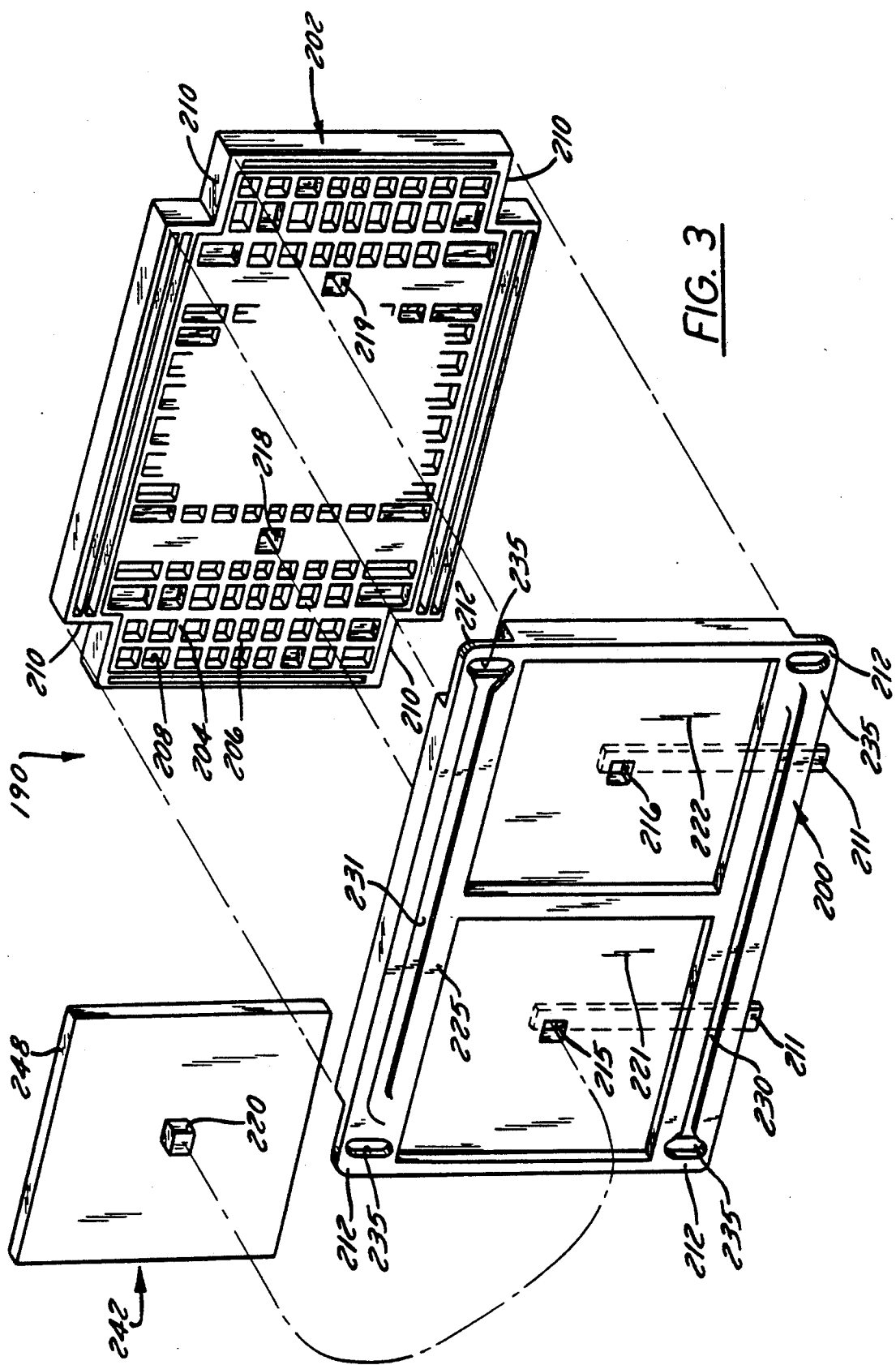

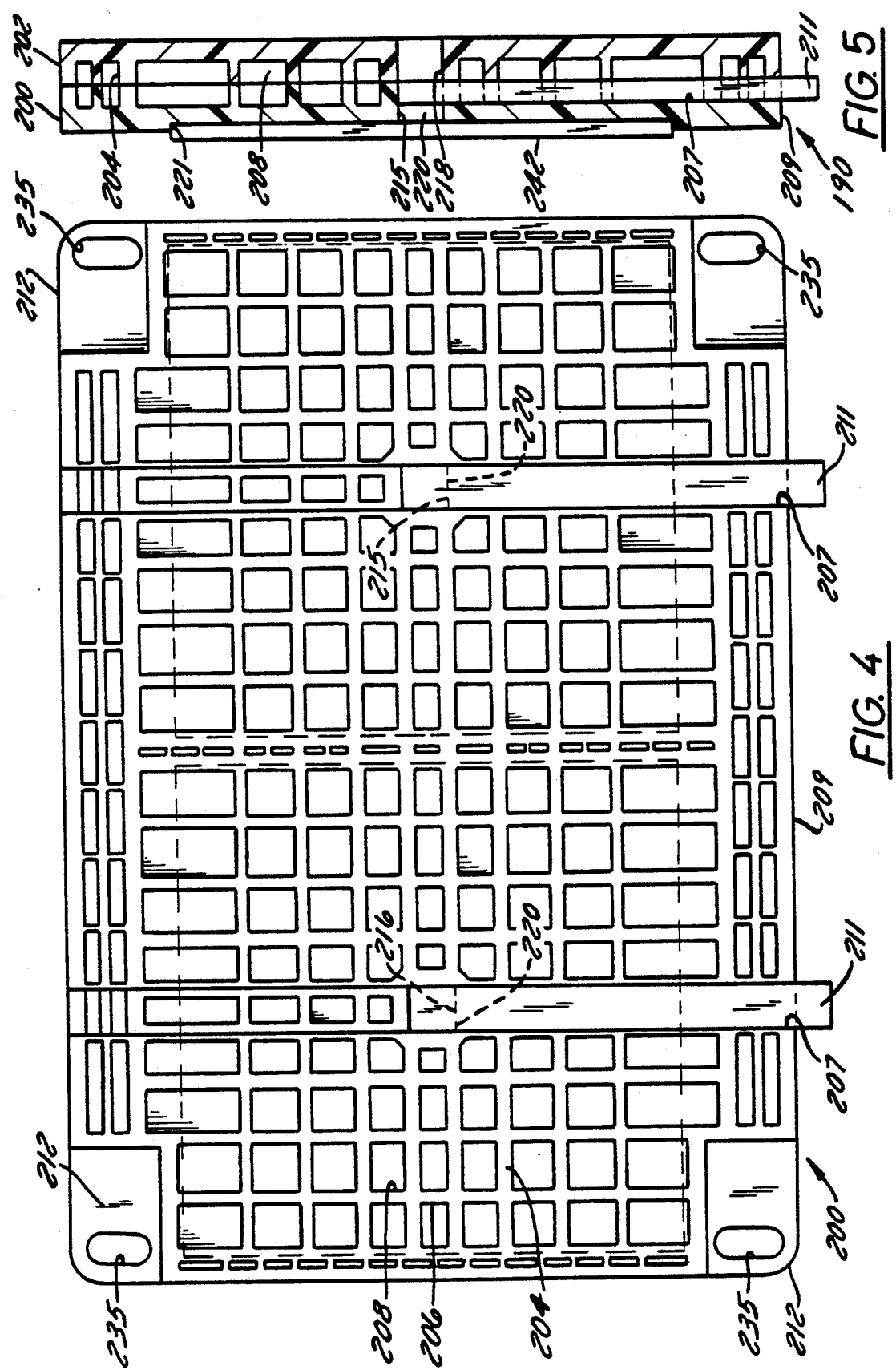

END BLOCK CONSTRUCTIONS FOR BATTERIES

BACKGROUND OF THE INVENTION

1. Field of the Invention

The present invention relates generally to end blocks for batteries and more particularly to an end block construction which eliminates components, reducing cost while maintaining structural integrity. In its most preferred form, the present invention relates to end blocks for zinc/bromine or other flowing electrolyte batteries, which include recesses for the terminal electrodes, as well as a simplified support structure designed for structural rigidity.

2. Description of the Prior Art

In U.S. Pat. No. 5,002,841, owned by the assignee of the present invention, a conventional flowing electrolyte bipolar battery is shown. It includes a stack of cells, an electrolyte pump, an electrolyte reservoir, a cooling element, and external studs in electrical communication with the terminal electrodes. Each cell is comprised of an electrode upon which the anodic reaction takes place and an electrode upon which the cathodic reaction takes place.

In typical bipolar batteries, each electrode comprises two poles, such that the anodic reaction occurs on one side of the electrode and the cathodic reaction occurs on the opposite side of the same electrode. In contrast to monopolar batteries which require two separate electrodes per cell, a bipolar battery consists of only one structure. As with a monopolar battery, the cells in a bipolar battery are electrically connected in series. Unlike a monopolar battery, however, where the cells are hydraulically isolated, the cells of a flowing electrolyte bipolar battery are hydraulically connected in parallel. The '841 patent describes current flow and the structure of bipolar batteries of the zinc/bromine type and is incorporated herein by this reference.

One of the requirements for flowing electrolyte bipolar batteries are end blocks, between which are sandwiched the cells stacks. The end blocks are supporting structures and provide the framework for duct and shunt tunnels to communicate with interiorly disposed elements of the flow system of the battery. Additionally, the blocks support the terminal studs which electrically communicate with the end or terminal electrodes of the cell stack. Not only must the blocks be inert to the various chemicals of the fluid anolyte/catholyte system, the end blocks must resist bending or bowing caused by different pressures which exist between the atmosphere and the internal operating environments of such batteries. In a typical zinc/bromine battery, operating pressures may easily reach 15 psi. Bowing of the end plates may result in non-uniform electrolyte distribution, resulting in a significant reduction in voltage and/or discharge capacity.

In zinc/bromine batteries, bowing of the end block may also result in poor zinc plating, causing undesirable dendritic growth which, if uncontrolled, could provide a short circuit for current in a particular cell and eliminate its voltage contribution.

Various attempts have been made to provide end blocks which minimize bowing and the resulting problems described above. Steel plates coated with inert material have been employed, leading to a sacrifice of an important battery design criteria, i.e. weight. Others have used plastic corrugations on the end plate to provide additional strength, leading to the sacrifice of another battery design criteria, i.e. overall volume. The solution proposed in the aforementioned '841 patent is a lightweight, deflection-resistant end block which included a base member made of a lightweight, chemically inert and chemically resistive material having one or more cavities for housing low density, substantially rigid inserts, such as honeycombed aluminum. The inserts are encapsulated by a cover welded or otherwise secured to walls located on the base member. The base member also extends beyond the walls to provide a means for receiving the various ducts carrying the flowing electrolyte to and from the interior of the battery, thereby isolating the inserts from possible exposure to the electrolytes. While the foregoing design represented a significant improvement over prior designs, four components are required (including the two insets), each of which has to be manufactured to relatively close tolerances and which require care in assembly.

In addition to the end block structures, such as those disclosed in the '841 patent, batteries of this type typically include a frame on the inside of each end block, such frames having compartments for receiving the terminal electrodes. The frames are additional elements required to construct the battery, and the elimination of such components would result in a desirable savings in the number of components required. The combined elimination of components from the end block and from the structure used to house the terminal electrodes would represent a significant advance in this art.

SUMMARY OF THE INVENTION

The present invention features an end block construction which, in a preferred form, includes an end plate and a cover, each of which includes a ribbed pattern. The end plate and cover are welded together along the upper surfaces of the ribs to provide an integral structure having all the advantages of the prior insert design, while eliminating components and reducing steps in the assembly of batteries.

In its most preferred form, the present invention features an end block in which the end plate is provided with recesses for receiving the terminal electrodes, which are attached to the end plate by an adhesive or by fusing the edges of the electrodes to the end plate. Such design eliminates two additional components presently used in the construction of such batteries, i.e., the terminal electrode frames.

The present invention also allows recycling without the additional step required with the present designs of removing the aluminum inserts from the end block plates.

DESCRIPTION OF THE DRAWINGS

In the following drawings, like reference numerals are used to indicate like components.

FIG. 3 is an exploded perspective of an end plate and cover in accordance with the present invention;

FIG. 4 is a front elevation view of the end plate of FIG. 3; and

FIG. 5 is a sectional view showing the terminal electrode and end block of the present invention.

DETAILED DESCRIPTION OF THE PREFERRED EMBODIMENT

Before proceeding to a description of the preferred embodiment of the present invention, several general comments need to be made about the applicability and the scope of the invention. First, the end block arrangement shown in the preferred embodiment incorporates two features of the invention, i.e., recesses in the end plate for receiving the terminal electrodes and a grid pattern used to provide structural rigidity. The illustrated block is formed by combining, through a welding operation an end plate and a cover, each including a portion of the rib pattern. It should first be pointed out that the end block construction itself could be used with separate terminal electrode frames, such as those which will be described in connection with FIG. 1. In the alternative, the terminal electrode recesses could be used with other end block configurations, such as the one described in the prior art '841 patent. Furthermore, while the preferred material for forming the end block of the present invention is high density polyethylene filled with glass fiber (preferably filled in an amount of 5% to 30%), other materials could be employed which provide the desired rigidity and resistance to the temperature and chemical environments typically encountered during use of such batteries. Also, it should be understood that the reference to the prior art battery should not be considered as limiting with regard to the structure thereof, but it should be understood that the end block construction of the present invention has utility in batteries of this general type, no matter the specific construction, arrangement of channels and ducts, etc.

Figure 1:
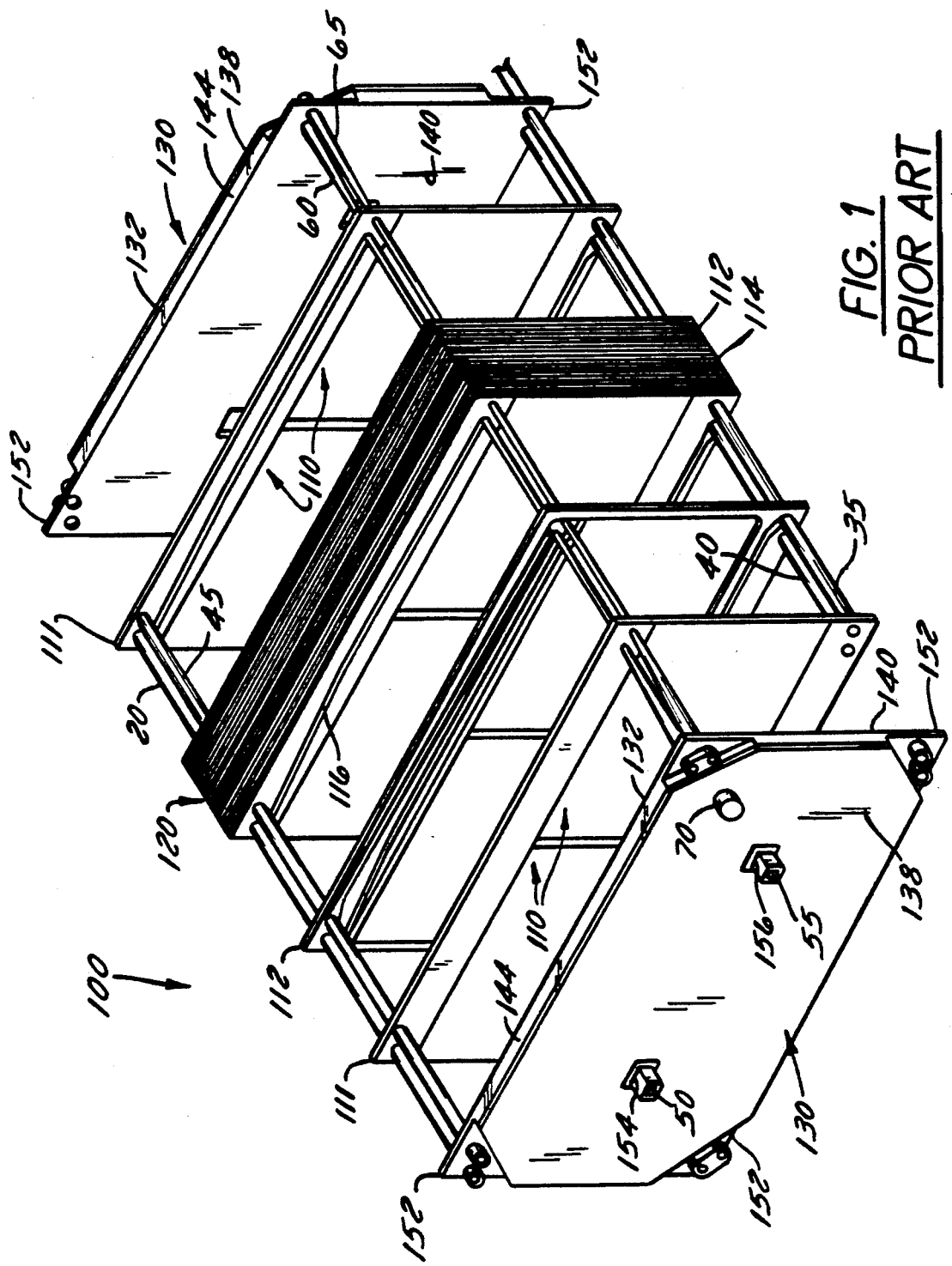
FIG. 1 is a perspective view of the various components of a bipolar battery sandwiched between a pair of end blocks in accordance with the prior art '841 patent referred to above.

Referring now to FIG. 1, a bipolar battery 100 comprises a pair of end blocks 130 disposed exterior to a series of alternating separators 112 and electrodes 114 and sealed together to form a stack 120 of electrochemical cells. A pair of terminal electrodes 110 are shown separated from end blocks 130 and contained within a separate frame element 111.

To provide the aqueous anolyte and catholyte to the respective half cells, anolyte and catholyte inlet ducts 35 and 20, respectively, and respective anolyte and catholyte discharge ducts 45 and 40 are positioned to facilitate passage of the aqueous anolyte and catholyte. Channels 116 are provided on each side of electrodes 114 or separators 112, as desired, for the proper flow of the fluid electrolyte. The various details involving the structure of the internal components and the movement of the aqueous anolyte and catholyte are not, in and of themselves, part of the present invention, but may be found in prior art patents such as U.S. Pat. No. 4,945,019, commonly owned and incorporated herein by way of this reference.

Battery 100 is further provided with a pair of shunt tunnels 60 and 65 and preferably a removable shunt terminal 70, which help minimize the effect of parasitic currents which often plague bipolar batteries of the zinc-bromine type. U.S. Pat. No. 4,929,325 describes in detail such a removable terminal and is incorporated by way of this reference.

Figure 2:
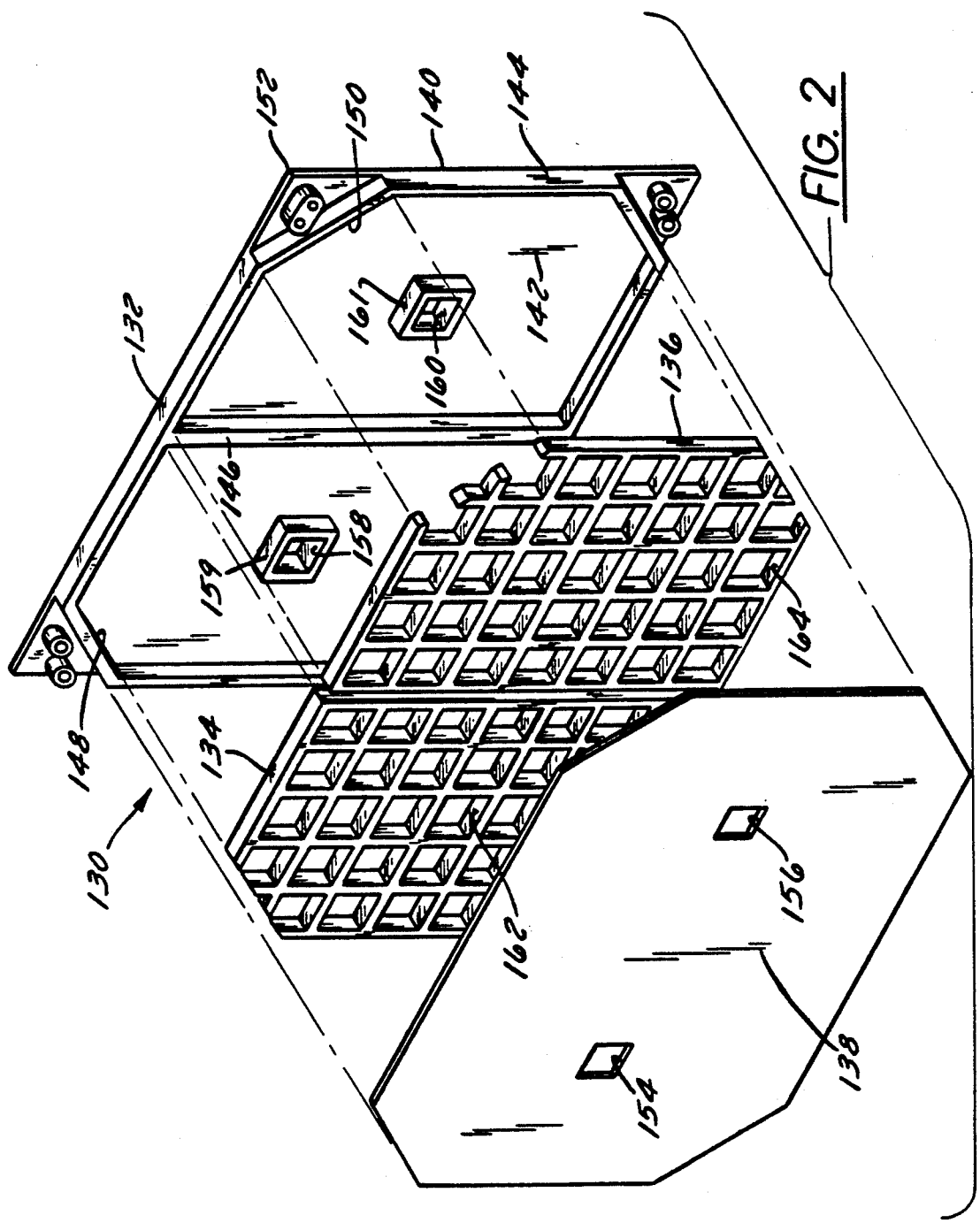
FIG. 2 is an exploded perspective of one of the end blocks used in the battery of FIG. 1.

Referring next to FIG. 2, the end block 130 is depicted in an exploded view and is made of four major components, a base 132, a pair of end block inserts 134 and 136, and a cover 138. Base 132 is essentially a thin, planar member having a first "major surface" 140 on the reverse side of a second major surface 142, seen in this FIGURE. Major surface 140 is essentially flat, while major surface 142 is totally circumscribed by a wall 144 projecting outwardly from the surface 142 except for corners 152. A dividing wall 146 bisects the area of surface 142 within the perimeter of wall 144 such that wall 146, together with wall 144 and surface 142, define a pair of cavities 148 and 150. Wall 146, which may have a width of about 0.5 inches, acts as a reinforcing rib to provide rigidity to base 132 and end block 130.

The inserts are housed within cavities 148 and 150. Walls 144 and 146 ensure encapsulation of the inserts by extending outwardly from surface 142 by a distance equal to or slightly greater than the thickness thereof.

The flat cover 138 has a configuration which is preferably the same as that of the outside edge of wall 144. This keeps the corners 152 of the base member 132 exposed when the cover is secured to wall 144. The corners 152 serve as supporting structures for various ducts and tunnels, and the inserts are thereby completely isolated from the ducts and tunnels by wall 144.

Rectangularly shaped studs 50 and 55 extend through each end block 130 from the terminal electrodes. The number is a matter of design choice. In the illustrated embodiment, each component of end block 130 is provided with a pair of openings through which the studs extend when the components are fully assembled. Base member 132 has a pair of rectangular shaped openings 158 and 160 circumscribed by respective rectangular shaped extensions or protrusions 159, 161 extending from major surface 142. These are centrally located within cavities 148 and 150. Complementary openings 162 and 164 are formed within respective inserts 134 and 136 such that the protrusions 159 and 161 extend therethrough in a snug relationship. Protrusions 159 and 161 thus serve to electrically insulate studs 50 and 55 from the inserts. The length of the extensions of protrusions 159 and 161 should be about the same or slightly greater than the thickness of the inserts, i.e., about the same as the extension of wall 144 and 146, such that the top surface of each protrusion abuts cover 138 around the openings 154, 156 formed in cover 138.

In the embodiment described as prior art and disclosed heretofore, the base members are preferably made from filled polyethylene or other polyolefin materials. The inserts are preferably fabricated from a low density but very strong material, and in the '841 patent, the inserts are made from a honeycombed aluminum laminated on either side with aluminum sheet, commercially available under the registered trademark Hexcel ®, from the Hexcel Company and identified as aluminum honeycomb bonded panels.

Proceeding next to FIGS. 3–5, the end block 190 of the present invention can be explained. The electrode stack and other components which are shown in, for example, FIG. 1, could be used with this end block 190, so they are not shown here. The present invention can thus be better understood and the drawings will be less cluttered. In FIG. 3, the end plate 200 and cover 202 each include a raised pattern of intersecting ribs, including a plurality of ribs 204 which are parallel to the long axis of the end block 190, and a series of ribs 206 arranged perpendicularly thereto. The result is a plurality of cavities 208 defined by the ribs. From the perspective view of FIG. 3 and FIG. 4, it will be seen that the spacing of the ribs 204 and 206 is not equal and that the size of cavities 208 vary in a pattern which is preferred, but not critical to the present invention. Through various stress testing, it has been determined that the pattern illustrated provides the most rigid structure, but other patterns could certainly be used without departing from the intended scope of the invention.

Plate 200 is generally rectangular in configuration, while the cover 202 has rectangular cutouts 210 at each corner, whereby, when the two components are joined, the corners 212 of plate 200 will be exposed for the same reasons previously discussed in connection with prior art end plate corners. The corners may include bosses molded into the part for connection of the anolyte and catholyte inlet and discharge ducts.

By reference to FIGS. 3–5, it will be understood that the patterns of ribs 204 and 206 are identical so that when placed in a confronting arrangement, the top of ribs 204 and 206 will abut one another (see especially FIG. 5), so they can be welded together, e.g., using vibration welding techniques, in and of themselves known to the art. When such welding takes place, an integral structure will be formed which is rigid and is made from fewer components than in previous designs.

It will also be seen from FIG. 3 that end plate 200 and cover 202 each include a pair of openings 215, 216 and 218, 219, respectively, adapted to receive therethrough tabs 220 of the terminal electrodes soon to be discussed. Note in FIG. 4 that two elongate recesses 207 are formed in end plate 200 extending to edge 209 thereof. Recess 207 are designed to receive bus bars 211 coupled to the ends of tabs 220 so that electrical connections to this battery can be made at the edge of the end block 190.

The surface 225 of plate 200, which is opposite to the surface containing the ribs, includes two generally square recesses 221–222 having a depth of, for example, 0.08 inches. The openings 215–216 are located generally in the center of each recess. Channels 230 and 231 are shown along the upper and lower margins of plate 200 on the surface 225 thereof, as are the openings 235 at each corner, through which the various ducts previously discussed may pass.

One terminal electrode is shown at 242. The terminal electrodes themselves may be attached to surface 225 of end block 200 in any suitable manner, such as by fusing the periphery 248 thereof to the edge of the recesses 221 and 222. If the terminal electrodes include a thermoplastic element at the edge, heat sealing can conveniently be used. Otherwise, other joining techniques, including the use of adhesives, could be employed.

FIG. 5 is a cross-sectional view which shows the fully assembled and welded components, primarily plate 200, cover 202, ribs 204 and 206, one of the pair of matching recesses (in this case 215 and 218) and the electrode 242 with its tab 220. The ribs are welded to one another across the entire area of their mating upper surfaces, forming a plurality of cavities in the recesses through which the collector tabs pass. It will also be appreciated by reference to FIG. 5 that the terminal electrode is received within recess 221 and that there is no need for a frame for such electrodes as was the case with prior designs.

While the illustrated end plate 200 and cover 202 show ribs of identical height, it is not necessary that the ribs be of equal height for the principles of the invention to be employed. For example, the ribs on either of the two components could be higher than the ribs on the mating component. Such a construction would yield an integral and strong end block for use in batteries of the type with which the present invention is concerned. It is also possible to have the entire rib configuration be present on one or the other of the end plate or cover, but we have found that molding techniques for preparing the individual components are better suited to forming the ribs in a manner so that a portion thereof are formed on each of the two planar surfaces.

The end block configuration of the present invention provides the required structural support, while eliminating a plurality of elements previously employed in such batteries. These include the frames for the terminal electrodes and separate inserts in the end block itself.

While the present invention has been described in connection with a particular preferred embodiment, it is not to be limited thereby but is to be limited solely by the claims which follow.

What is claimed is:

1. A battery comprising electrode elements and at least one end block comprising:
   a first planar element having a first and a second surface and a plurality of ribs on the first surface defining a pattern;
   a second planar element having a first and a second surface and a plurality of ribs on the first surface defining a pattern;
   the ribs of the first and second elements having tops, the tops of the ribs of the first and second elements being joint to one another, the ribs being formed integrally with the elements.

2. The battery of claim 1, wherein the elements and ribs are formed from glass filled polyolefin resin.

3. The battery of claim 2, wherein the ribs are joined by vibration welding.

4. The battery of claim 1, wherein the pattern comprises a first plurality of ribs parallel and spaced apart from one another and a second plurality of ribs parallel and spaced apart from one another and perpendicular to the first plurality.

5. The battery of claim 1, comprising at least one aperture extending through the end block and perpendicular to the first and second elements.

6. The battery of claim 4, wherein at least one aperture extends through the end block and perpendicular to the first and second elements.

7. The battery of claim 1, wherein the first element is generally rectangular and the second element is generally rectangular, except that the corners are removed therefrom.

8. The battery of claim 1, wherein at least one recess is formed in the second surface of the first element.

9. The end block of claim 6, wherein at least one recess is formed in the second surface of the element and wherein the aperture extends through the recess.

10. In combination, a terminal electrode for a battery and an end block, the end block comprising:
    a first planar element having a first and a second surface and a plurality of ribs on the first surface defining a pattern;
    a second planar element having a first and a second surface and a plurality of ribs on the first surface defining a pattern;
    the ribs of the first and second elements having tops, the tops of the ribs of the first and second elements being jointed to one another, the ribs being formed integrally with the elements.

11. The invention of claim 10, wherein the elements and ribs are formed of a glass filled polyolefin resin.

12. The invention of claim 11, wherein the ribs are joined by vibration welding.

13. The invention of claim 10, wherein the pattern comprises a first plurality of ribs parallel and spaced apart from one another and a second plurality of ribs parallel and spaced apart from one another and perpendicular to the first plurality.

14. The invention of claim 10, comprising at least one aperture extending through the end block and perpendicular to the first and second elements, the terminal electrode including a collector tab extending through an aperture.

15. The invention of claim 14, comprising a pair of terminal electrodes and a pair of apertures.

16. The invention of claim 10, further comprising at least one recess in the second surface of the first element, a terminal electrode being disposed in a recess.

17. The invention of claim 14, comprising a recess in the second surface of the first element for each terminal electrode.

18. The invention of claim 17, wherein each terminal electrode includes a peripheral portion adhered to the second surface of the first element.

* * * * *